United States Patent [19]

Fountain

[11] 3,971,532
[45] July 27, 1976

[54] RUDDER RESTRAINT FOR GROUNDED AIRCRAFT

[76] Inventor: Craig Fountain, P.O. Box 9067, Moscow, Idaho 83843

[22] Filed: Aug. 4, 1975

[21] Appl. No.: 601,276

[52] U.S. Cl. ................................ 244/1 R; 244/83 A
[51] Int. Cl.² ......................................... B64F 1/00
[58] Field of Search ................... 244/1 R, 83 A, 87; 292/288; 267/74

[56] References Cited
UNITED STATES PATENTS

| | | | |
|---|---|---|---|
| 3,288,401 | 11/1966 | Fete | 244/83 A |
| 3,589,760 | 6/1971 | Williams | 292/288 |

*Primary Examiner*—Trygve M. Blix
*Assistant Examiner*—Barry L. Kelmachter
*Attorney, Agent, or Firm*—Wells, St. John & Roberts

[57] ABSTRACT

A rudder restraint for grounded aircraft includes a central rudder trailing edge engaging bracket that may be secured on opposite sides of an airplane empennage by anchor clamps attached to the bracket through nonextendible cords. The clamps are attached to leading edges of opposite horizontal stabilizers. The leading edge clamps, nonextendible cords and central bracket hold the rudder against movement about its pivot axis. A spring is connected in line with one of the cords to enable a uniform tension to be applied to both cords when the restraint is positioned on the aircraft.

5 Claims, 5 Drawing Figures

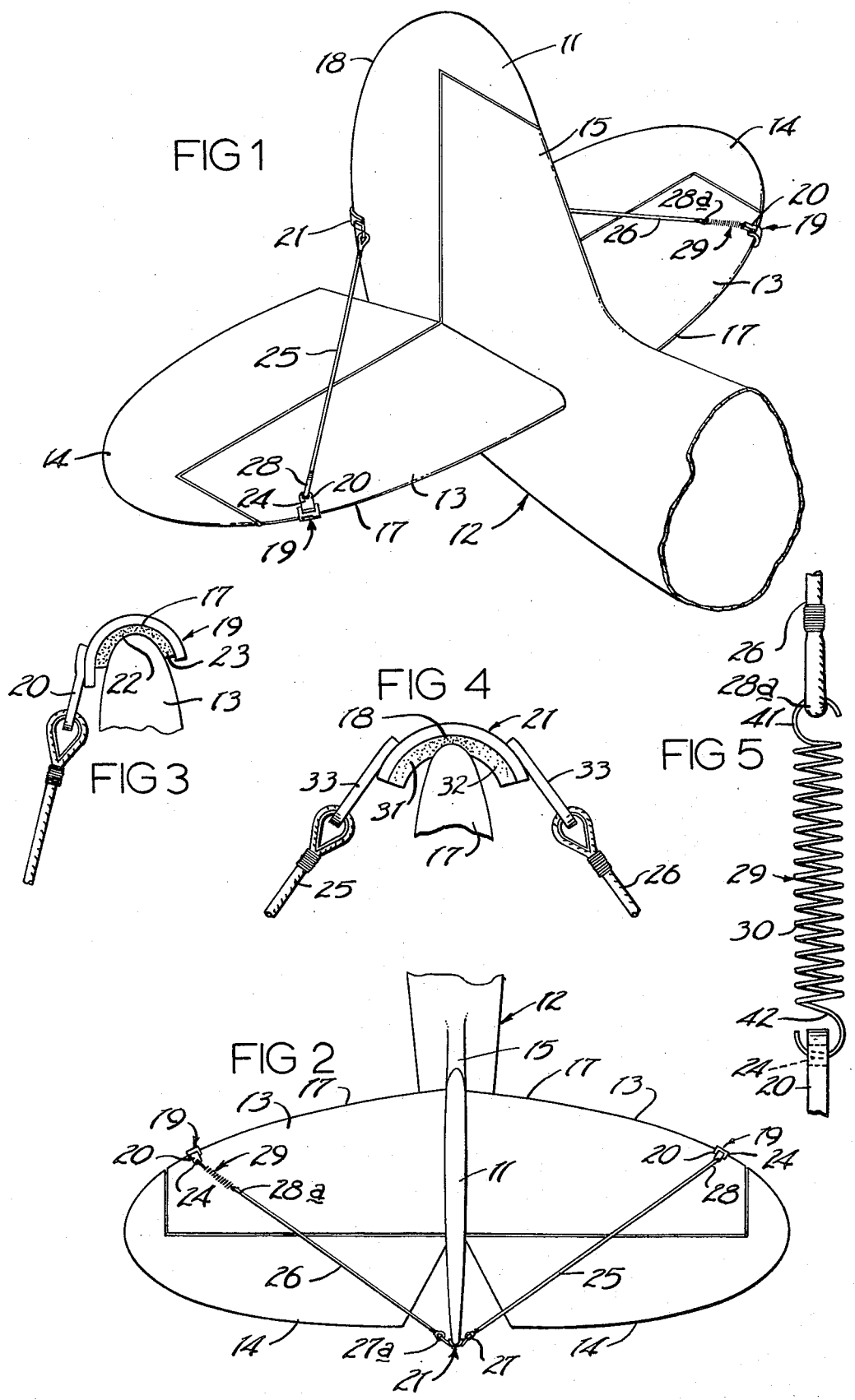

RUDDER RESTRAINT FOR GROUNDED AIRCRAFT

BACKGROUND OF THE INVENTION

The present invention is related basically to restraints for control surfaces of grounded or stored airplanes and more particularly to such restraints for preventing movement of the airplane rudder about its normal pivot axis.

Aircraft stored adjacent to a landing field are often subjected to extremely strong gusts of air from the prop wash of other airplanes in the process of taking off or landing. The rudders of grounded aircraft are very susceptible to damage in such high velocity air currents. It is therefore desirable to obtain some apparatus for securing the rudder against such movement when the airplane is in a stored or parked condition.

This problem has been realized to a certain degree by U.S. Pat. No. 3,288,401 to C. Fete which discloses an aircraft rudder lock structure. This device utilizes a pair of rigid bars connected at ends to form a V-shaped member. Clamps are attached to the extremities of the connected bars. Two end clamps are utilized to secure the device to the elevator surfaces while the central clamp is connected to the rudder. Wind force against the rudder is transferred through the rigid bars to the elevators. For example, wind coming in a lateral direction and striking flush against the rudder surface would result in a downward force on one of the bars while the other would be lifted upwardly. If the wind force were excessive, not only could serious damage be done to the rudder, but also to the elevators which are ordinarily intended to move in the same direction.

It is a primary object of the present invention to provide a rudder restraint whereby the rudder may be held against pivotal movement by restraint members connected to the leading edges of the horizontal stabilizers.

It is a further object to provide such a restraint that is very simple in construction and inexpensive to purchase.

It is a still further object to provide such a restraint that may be utilized by differing styles and sizes of airplanes without requiring adjustment.

These and still further objects and advantages will become apparent upon reading the following description which, taken with the accompanying drawings, describe a preferred form of the present invention.

BRIEF DESCRIPTION OF THE DRAWINGS

A preferred form of the present invention is illustrated in the accompanying drawings in which:

FIG. 1 is a pictorial view of an airplane empennage with the present restraint mounted thereon;

FIG. 2 is a reduced plan view of the empennage and present restraint;

FIG. 3 is an enlarged fragmentary view showing one of the clamp members;

FIG. 4 is an enlarged fragmentary view showing the central bracket member; and

FIG. 5 is an enlarged detail of the spring assembly.

DETAILED DESCRIPTION OF A PREFERRED EMBODIMENT

A preferred form of the present rudder restraint is illustrated in the accompanying drawings and is designated generally therein by the reference numeral 10. The restraint 10 is utilized to lock an upright rudder 11 of an airplane empennage 12 against pivotal movement about its axis.

Included in the empennage 12 is a rudder 11 and oppositely extending horizontal stabilizers 13 having movable elevators 14 mounted along the rear edge thereof. The rudder 11 is mounted to a vertical stabilizer 15 between horizontal stabilizers 13. Horizontal stabilizers 13 include forwardly facing leading edges 17 which are stationary and utilized as anchor points for the present invention. Rudder 11 includes a trailing edge 18 that is also utilized by restraint 10 in conjunction with leading edges 17 to hold the rudder against pivotal movement.

In looking at rudder restraint 10 in greater detail, particular reference will be had to FIGS. 3 and 4. Firstly, the restraint is comprised of a pair of leading edge clamps 19 connected to a center bracket 21 by first and second cords 25 and 26. The cords 25 and 26 are formed of wire rope or other flexible and nonextendible material. Flexibility of the cords enables selective placement of the restraint in a variety of empennage configurations.

FIG. 3 shows in detail the configuration of one of the clamps 19. Clamps 19 are identical each having an ear 20 for receiving a cord 25 or 26. Also each clamp 19 includes a concave surface 22 that is complementary in configuration to the leading edge 17 of stabilizers 13. Inside the surfaces 22 are provided cushions 23 formed of a plastic foam or rubber material. The cushions 23 serve to prevent damage to the leading edges and to resist frictional movement along the leading edge in response to tension along the cords 25 and 26.

The flexible cords 25 and 25 each have an end 27, 27a connected to the center bracket 21. Cord 25 includes a remaining end 28 connected to a clamp 19. However, a tension means 29 is connected between one clamp 19 and an end 28a of cord 26.

Tensioning means 29 is shown in FIG. 5 as simply comprised of a coil tension spring 30 connected between the end 28a of cord 26 and a clamp 19. Spring 30 includes eyelet ends 41 and 42 that receive end 28a of cord 26 and eyelet 24 of the clamp 19. Spring 30 is selected to place the cords 25 and 26 under constant tension while the restraint is in place on an aircraft.

FIG. 4 shows the center bracket 21 in substantial detail. The bracket 21 includes a concave surface 31 that also provides an inner cushion 32 of a material similar to that forming the cushions 23. Cushion 32 is utilized to engage the trailing edge 18. Also, the cushion material 32 resists sliding movement along the trailing edge 18. The bracket 21 includes oppositely projecting ears 33 having apertures 34 therein for receiving ends 27, 27a of cords 25 and 26.

In order to place the present restraint on an aircraft, the user first attaches one of the clamps 19 to the leading edge 17 of a horizontal stabilizer 13. He then positions bracket 21 at a position along the trailing edge 18 above the elevation of brackets 19. After bracket 21 is in place, the second clamp 19 may be secured to the opposite leading edge 17.

In order that the cords be held in a uniformly taut condition, it is preferred that the clamps 19 be spaced substantially apart on either side of the vertical stabilizer 15. It is also preferred that bracket 21 be located a sufficient distance above the horizontal stabilizers 13 to put the cords under a desired degree of tension.

When the device is in place, a wind force exerted against the aerial sides of rudder 11 will be transferred as tension through the nonextendible cords 25 and 26 to stationary leading edges 17 of horizontal stabilizers 13. The stationary stabilizers provide a solid anchor for cords 25 and 26 to prevent pivotal movement of rudder 11 about its pivot axis.

The restraint is removed simply by reversing the operation stated above for placing the restraint on the airplane empennage.

The above description and attached drawings are given to disclose a preferred form of the present invention. However, only the following claims are to be taken as definitions of the present invention.

What I claim is:

1. A rudder restraint for grounded or stored airplanes, comprising:
   a first clamp member for engaging the leading edge of a first horizontal stabilizer of an airplane empennage;
   a first nonextendible flexible cord connected at one end to the first clamp member;
   a rudder trailing edge engaging bracket connected to the remaining end of the first flexible cord;
   a second nonextendible flexible cord connected at one end to the rudder engaging bracket;
   a second clamp member connected to the remaining end of the second cord for engaging the leading edge of a second horizontal stabilizer of the airplane; and
   cord tensioning means for holding the cords taut when the first and second clamp members are in position on the leading edges of the horizontal stabilizers and the rudder engaging bracket is engaged with the trailing edge of the rudder.

2. The rudder restraint as recited by claim 1 wherein the tensioning means is comprised of a tension spring connected between the first clamp member and the first cord.

3. The rudder restraint as recited by claim 1 wherein the first and second clamp members include concave leading edge engaging surfaces covered with a cushioning material to prevent damage to the leading edges and to resist sliding movement along the leading edges.

4. The rudder restraint as recited by claim 3 wherein the rudder engaging bracket includes a concave rudder trailing edge engaging surface covered with a cushioning material to cushion the rudder trailing edge and resist sliding movement along the rudder trailing edge.

5. The rudder restraint as recited by claim 4 wherein the tensioning means is comprised of a tension spring connected between the first clamp member and the first cord.

* * * * *